UNITED STATES PATENT OFFICE.

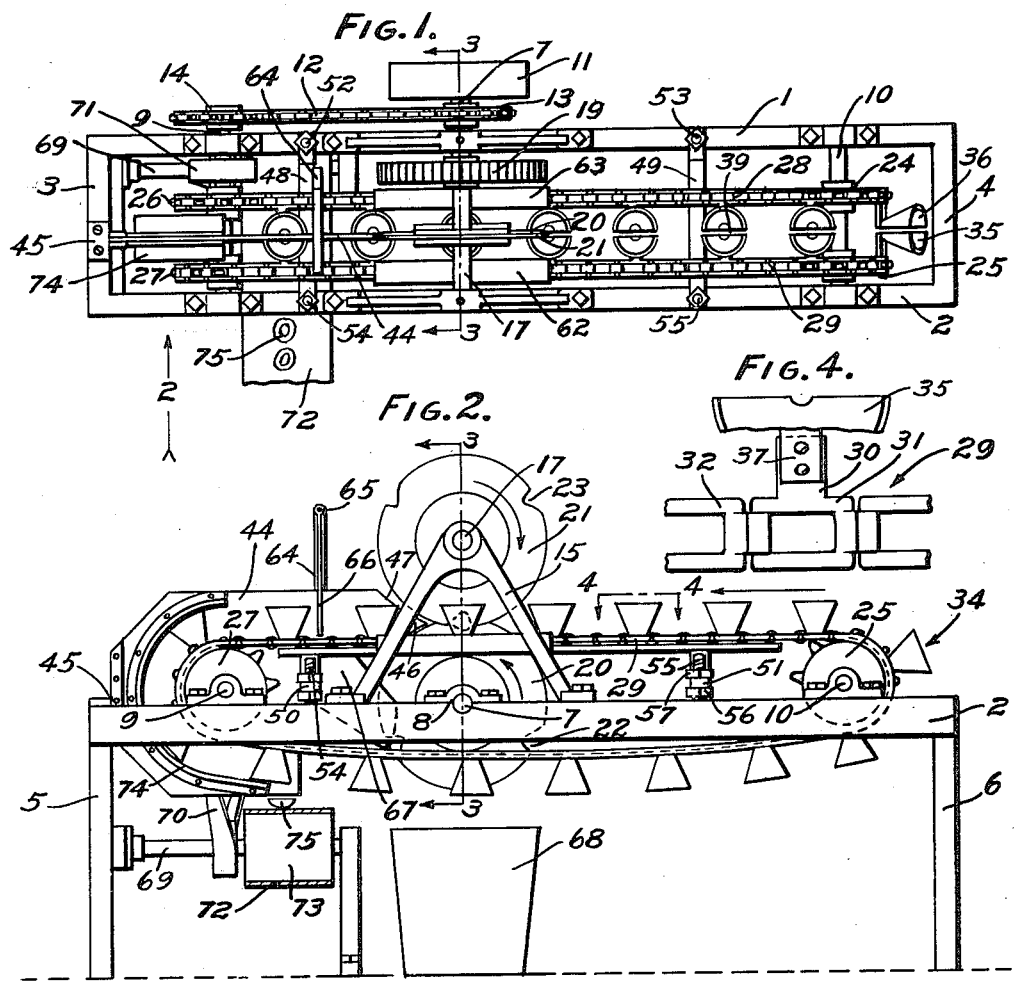

GEORGE W. CLEMSON, OF OWENSMOUTH, CALIFORNIA.

FRUIT SLICER AND PITTER.

1,261,704. Specification of Letters Patent. Patented Apr. 2, 1918.

Application filed December 11, 1917. Serial No. 206,691.

*To all whom it may concern:*

Be it known that I, GEORGE W. CLEMSON, a citizen of the United States, residing at Owensmouth, in the county of Los Angeles and State of California, have invented new and useful Improvements in Fruit Slicers and Pitters, of which the following is a specification.

My object is to provide an improved machine for splitting and pitting fruit such as apricots and peaches, and my invention consists in the novel features herein shown, described and claimed.

Figure 1 is a top plan view of the fruit slicer and pitter embodying the principles of my invention.

Fig. 2 is a side elevation looking in the direction indicated by the arrow —2— in Fig. 1.

Fig. 3 is a vertical cross-section on the lines 3—3 of Figs. 1 and 2 and looking in the direction of the arrows.

Fig. 4 is an enlarged fragmentary detail on the line 4—4 of Fig. 2.

Fig. 5 is a fragmentary side elevation illustrating the operation of splitting the fruit.

Fig. 6 is an edge view of the parts shown in Fig. 5.

Fig. 7 is a view analogous to Fig. 5, and showing a further step in the operation.

Fig. 8 is a fragmentary sectional detail on the line 8—8 of Fig. 7.

The side pieces 1 and 2 and the end pieces 3 and 4 are rigidly connected together to form a long rectangular main frame supported upon legs 5 and 6. The driving shaft 7 is mounted in bearings 8 transversely of the frame and near the longitudinal center. The carrier shafts 9 and 10 are mounted near the ends of the frame and parallel with the shaft 7. A belt wheel 11 is fixed upon the outer end of the shaft 7 and a sprocket chain 12 connects a sprocket 13 fixed upon the drive shaft 7 to a sprocket 14 fixed upon the carrier shaft 9.

Posts 15 and 16 are fixed to the side bars 1 and 2 and extend upwardly and a shaft 17 is mounted in the upper ends of the posts parallel with the shaft 7. A spur gear 18 is fixed upon the shaft 7 and meshes with a spur gear 19 fixed upon the shaft 17. A fruit splitting disk 20 is fixed upon the shaft 7 and operates with a fruit splitting disk 21 fixed upon the shaft 17, like a rotary shear. The edges of the disks 20 and 21 overlap and notches 22 and 23 are formed in the edges of the disks and the disks are mounted so that the notches will match when they come together at the vertical center line, said notches forming a clearance for passing the pit of the fruit.

Sprocket wheels 24 and 25 are fixed upon the shaft 10 and similar sprocket wheels 26 and 27 are fixed upon the shaft 9. A sprocket chain 28 connects the sprockets 24 and 26 and a similar chain 29 connects the sprockets 25 and 27. Arms 30 extend inwardly from links 31 on the chain 29, said links 31 being incorporated into the chain with three or four links 32 between each pair of links 31. Arms 33 similar to the arms 30 extend inwardly from the chain 28, the parts being assembled so that the arms 30 and 33 will come directly opposite each other in the two chains.

The fruit carrying cups 34 are each formed in two pieces 35 and 36, the pieces 35 having flanges 37 riveted to the arms 30, and the pieces 36 having flanges 38 riveted to the arms 33. The pieces 35 and 36 are semi-circular in plan and funnel-shaped in the side elevation and are assembled upon the chains 28 and 29 with longitudinal passage-ways 39 between the two pieces 35 and 36 so that the disks 20 and 21 may pass freely. The sprockets 24, 25, 26 and 27, the chains 28 and 29, and the cups 34 make an endless carrier to receive the fruit one at a time from the hands of the operator and carry it past the splitting disks 20 and 21 continuously. The splitting disks 20 and 21 are geared to move faster on their peripheries than the fruit travels in the carrier. The whole fruit, such as apricots, is fed into the cups one at a time by the operator and the apricot or the like is placed in the cup with its curves parallel with the slot 39 so that the edge of the pit will be parallel with the edges of the splitting disk. The splitting disks act to slice the fruit on a central line and the pits 40 come at the notches 22 and 23 as the fruit passes the vertical center line 41. The edge of the disk 21 is not only notched but it is turned slightly outwardly to form a lip 42, and the disk 20 is correspondingly turned outwardly in the opposite direction to form a lip 43, these lips serving to engage the pit 40 on opposite sides of the center, as shown in Fig. 8. Due to the fact that the splitting disks travel faster than the carrying chain, the pit is lifted bodily out of its position in the fruit and ejected through the passage-ways 39. It should be noted that because of the shape of the cup 34 the fruit is held in position therein while the pit is positively engaged by the lips 42, 43, and ejected through the passage 39.

A dividing plate 44 is mounted upon a bracket 45 secured to the rear end of the frame upon the end bar 3 and has a point 46 extending up to the splitting disks 20 and 21 and in line with the split in the fruit so as to separate the halves of the cut fruit as they are released from the splitting disks, the receiving edge 47 of the point being curved upwardly as it extends backwardly to a point above the cups.

Cross bars 48 and 49 have bearings 50 and 51 in each of their ends fitting upon stud bolts 52, 53, 54 and 55 fixed in the side bars 1 and 2 and extending upwardly, there being a nut 56 upon each stud bolt and under each bearing so as to adjust the bars 48 and 49 up and down, there being jam nuts 57 upon each stud bolt above each bearing. Carrier adjusting bars 58 and 59 are mounted upon the cross bars 48 and 49 under the chains 28 and 29 and extend from near the sprockets 24 and 25 to near the sprockets 26 and 27 so that by manipulating the nuts 56 and 57 the upper part of the carrier may be adjusted up and down relative to the cutting edges of the splitting disks 20 and 21 as required for larger or smaller fruit and as required to have the pits come in the right place at the time they are being extracted. The upper outer corner of the bar 58 is recessed to receive the chain 29 and the upper inner face 60 forms a bearing upon which the arms 30 slide. In a like manner the upper outer corner of the bar 59 is recessed to receive the chain 28 and the upper inner face 61 forms a bearing upon which the arms 33 slide. A shield 62 is secured to the outer face of the bar 58 and extends upwardly and inwardly over the chain 29, and a corresponding shield 63 is secured to the outer face of the bar 59 and extends upwardly and inwardly over the chain 28 so as to hold the chains in line and to hold the arms 30 and 33 down upon the bearings 60 and 61 so that the carrier will run true in line. A bracket 64 extends upwardly from the cross bar 48 and a pivot 65 is fixed in the bracket and extends over the carrier at a point considerably above the plate 44 and a shield 66 is mounted upon the pivot 65 and is slotted and extends downwardly upon both sides of the plate 44 to near the belt chains so that as the cups 34 move along, the shield 66 will drag over the cups, said shield serving to catch or stop the loose pits and prevent their going on with the carrier. A spout 67 is fixed to the front side of the cross bar 48 and extends forwardly and downwardly to catch the pits and discharge them into a receptacle 68 mounted below the splitting disks.

A countershaft 69 is mounted longitudinally below the shaft 9 and is driven by a twisted belt 70 running over a pulley 71 upon the shaft 9. A conveyer belt 72 runs over a pulley 73 fixed upon the shaft 69 and over another pulley (not shown) and a shield 74 fixed to the plate 44 holds the sliced fruit in the cups as it is being turned bottom upward and then discharges the fruit 75 upon the belt 72. The shield 74 is shorter than the dividing plate 44, said dividing plate extending from the receiving position at the back of the splitters around the end of the carrier to a position where the cups are bottom upward, the two pieces of a split fruit being held apart by said dividing plate from the time the fruit is split until after it is discharged from the cup upon the belt. The dividing plate makes it necessary for the two halves of the fruit to fall apart and land upon their rounded sides upon the belt.

Various changes may be made in the details of construction without departing from the spirit of my invention as set up in the following claims.

I claim:

1. A fruit splitter and pitter comprising a frame, an endless slotted carrier mounted in the frame, slotted cups upon the carrier for receiving the fruit, and mating splitting disks mounted to extend through the slot and having notches for ejecting the pits.

2. A fruit splitter and pitter comprising a horizontal frame, shafts mounted transversely of the ends of the frame, an endless slotted carrier mounted upon the shafts, slotted cups mounted upon the carrier for receiving the fruit, and splitting disks mounted to extend through the slot in the carrier and having notches for ejecting the pits; the splitting disks being geared to operate faster than the carrier and having oppositely turned lips for engaging the pits.

3. A splitter and pitter comprising a frame mounted horizontally, two shafts mounted upon the frame parallel with each other and transversely of the frame, sprockets upon the shafts, two chains mounted parallel upon the sprockets, arms extending inwardly from the chains, half cups fixed upon the arms directly opposite each other and forming cups for receiving the fruit and so shaped as to hold the fruit firmly during the ejection of the fruit, splitting disks mounted to extend through the slot between the half cups and having notches for ejecting the pits, and a finger mounted in the slot between the half cups to hold the two halves of the split fruit separate after leaving the splitting disks.

4. In a fruit splitter and pitter an endless slotted carrier, adjusting bars mounted under the upper part of the carrier, and splitting disks mounted to extend through the slot in the carrier and having notches to eject the pits; so that by adjusting the bars the carrier may be raised or lowered to bring the pits into proper position.

5. In a fruit splitting and pitting machine, mating disks having mating notches and lips turned outwardly at the notches, said lips serving to assist in the ejection of the pit.

In testimony whereof I have signed my name to this specification.

GEO. W. CLEMSON.